United States Patent Office 2,713,519
Patented July 19, 1955

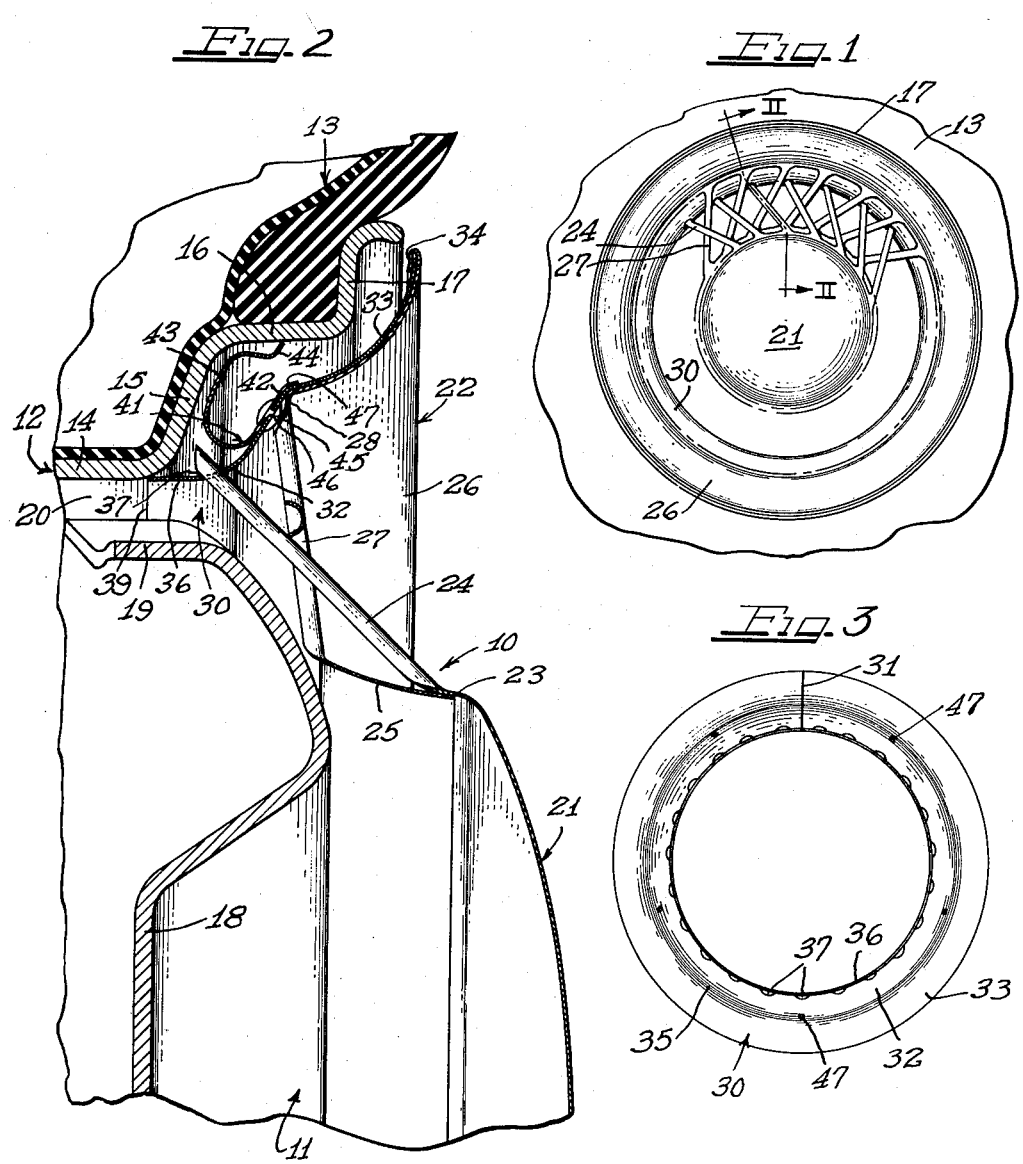

2,713,519

WHEEL COVER

George Albert Lyon, Detroit, Mich.

Application March 11, 1953, Serial No. 341,779

8 Claims. (Cl. 301—37)

The present invention relates to improvements in wheel structures, and more particularly concerns the ornamental and protective covering of the outer sides of vehicle wheels.

It is an important object of the present invention to provide a wheel structure having a novel wire spoke simulating wheel cover attached to the outer side of the wheel.

Another object of the present invention is to provide improved means for detachably retaining a wheel cover on a wheel in centered relation.

A further object of the present invention is to provide novel means for retaining a cover in limited engagement with and in predetermined axial disposition relative to the wheel.

Yet another object of the present invention is to provide in a wheel structure, including a wheel body and wheel cover, improved gravel guard means attached to the cover for blocking passage of dirt or rock fragments to the inner portion wheel.

Other objects, features and advantages of the present invention will be readily apparent from the following detailed description of a preferred embodiment thereof taken in conjunction with the accompanying drawings, in which:

Figure 1 is a front elevational view of a wheel structure embodying features of the present invention;

Figure 2 is an enlarged sectional view taken substantially on line II—II of Figure 1; and Figure 3 is a rear elevational view of the retaining flange and gravel guard member of the present cover.

A cover assembly 10 embodying features of the present invention is adapted to be applied to the outer side of a vehicle wheel including a wheel body 11 and a tire rim 12, the latter being of the multi-flanged drop center type adapted for supporting a pneumatic tire and tube assembly 13.

The tire rim 12 comprises a base flange 14 having an outer side flange 15 extending generally radially outwardly and axially outwardly. Directed generally axially outwardly and sloping radially outwardly from the side flange 15 is an intermediate flange 16 which merges with a terminal flange 17.

The wheel body 11 is preferably of the disk spider type and comprises a stamping made from suitable heavy gauge sheet material and having a central bolt-on flange 18 and an outer peripheral attachment flange 19 secured to the base flange of the tire rim. At suitable intervals, the attachment flange 19 is inset to provide a plurality of air circulation openings 20.

According to the present invention, the wheel cover assembly 10 comprises a composite structure provided with spoke-like elements which are constructed and arranged in crossing relation to simulate the spokes of a wire-spoked wheel, in the manner shown in Figure 1. To this end, the cover 10 comprises a central circular crown member 21 and an outer annular ring member 22, which are connected together by spoke elements to assume the appearance of spokes of a wire-spoked wheel.

The central crown portion or member 21 comprises a concave-convex disk type stamping made from a suitable thin gauge sheet metal such as stainless steel, brass or the like. In a preferred form, the crown member 21 is constructed to be disposed in axially outwardly spaced relation to the wheel body 11 and is reinforced at its outer periphery by a reinforcing marginal flange 23 which is turned in a generally axially inward and radially outward direction.

The marginal flange 23 is provided with a plurality of spoke-like elements, fingers or extensions 24 which project generally radially outwardly and axially inwardly and, in this instance, are angled peripherally in a counterclockwise direction when viewed from the front of the wheel. For rigidifying and strengthening the spoke extensions 24, and particularly to afford the appearance of wire spokes, the spoke elements are shaped into transversely rounded quarter, half, three-quarters or full-round form, the half-round form being illustrated in Figure 2.

The outer annular ring member may be constructed as a rolled section or as a stamping made from suitable thin gauge sheet material, such as stainless steel, brass or the like. Herein the ring member 22 comprises an inner marginal flange 25 underlying the marginal flange 23 of the crown member 21, and an outer annular body portion 26 which is disposed in axially outwardly spaced relation to and concentric with the inner marginal flange 25. The inner marginal flange 25 is of generally tubular shape flaring radially outwardly and axially inwardly to a position adjacent to but spaced from the wheel body 11.

Connecting the inner marginal flange 25 with the outer body portion 26 is a series of elongated spoke simulating elements 27 which extend generally radially and are angled peripherally in a clockwise direction when viewed from the front of the wheel. The spoke elements 27 are shaped similar to the spokes 24, that is, transversely rounded to simulate wire spokes. Each of the radially outer ends of the spokes 27 is reinforced by a rib juncture portion 28 with the inner margin of the outer portion 26.

The outer body portion 26 of the ring member 22 is preferably of concave-convex shape generally extending radially outwardly and axially outwardly with its axially inwardly facing surface spaced from the tire rim and thereby accommodating wheel balancing weights.

For positioning the radially inner ends of the spokes 24 and 27 in predetermined axially spaced relation from each other, and in this particular instance, to provide a substantially closed chamber for receiving a wheel hub (not shown), the axially outer margin of the ring flange 25 is constructed to snugly fit within and abut the marginal crown flange 23.

For the purpose of blocking passage of road dirt, small rock fragments, or gravel through the gap between the tire rim and the cover member 22 to the wheel body and more especially, to the wheel openings 20, the cover assembly 10 is provided with a gravel guard 30 which is disposed between the tire rim and the outer ring member 22. Preferably, the gravel guard is made from suitable thin gauge sheet metal which is adapted to be rolled or otherwise formed into an annular shape. In the present instance, the gravel guard 30 may be constructed from an elongated curved strip of metal having a constant width and having its ends butt welded together along a line 31 to form an annular gravel guard flange member, as illustrated in Figure 3.

The gravel guard 30 includes an inner flange section 32 and an outer flange section 33, the latter being of concave-convex transverse curvature, substantially the same as the curvature of the outer cover portion 26 of the ring member 22. For securing the gravel guard to the back side of the ring member 22, the outer periphery of the outer portion 26 is provided with a reinforcing flange 34 which is under-turned and crimped into retaining relation to the outer margin of the outer section 33 of the guard flange internested with the axially inwardly facing surface of ring body 26.

Reinforcement of the intermediate portion of the gravel guard member is provided by an annular reinforcing rib 35 which is internested with the rib portion 28 of the outer annular ring member 22. The inner flange section 32, which is integral with the reinforcing rib 35, extends radially inwardly and axially inwardly, and then terminates in a preferably straight axially inwardly extending cylindrical section 36.

Means are provided for interfitting the spoke elements 24 of the circular crown member 21 with the inner flange section 32 of the gravel guard. To this end, the inner flange section 32 is provided with a suitable number of apertures 37 for respectively receiving the radially outer ends of the spoke elements 24.

As best shown in Fig. 1, each of the spoke elements 24 is disposed with its base or radially inner end spaced axially outwardly from its corresponding spoke element 27, and with its radially outer end spaced axially inwardly of said spoke element 27, the spokes being in any preferred number and angularly related to each other in crossing relation to simulate the crossed wire spokes of a vehicle wheel.

For insuring spaced relation between the composite cover assembly and the vehicle wheel, the cylindrical section 36 of the gravel guard is provided with a terminal edge 39 which abuts the radially inner shoulder of side rim flange 15 at its juncture with the wheel body 11.

It will be observed that the engagement of the gravel guard 30 with the shoulder portion of the rim base flange 14 provides effective means for blocking and baffling passage of road gravel to the wheel body. On the other hand, the cylindrical section 36 of the gravel guard fits against the curved shoulder of the rim base flange 14 at the radially outer sides of the wheel openings 20 so that adequate clearance is afforded for passage of circulating air through the wheel body openings 20 and the spaces between the spokes 24 and 27.

Press-on, pry-off retention of the cover 10 on the vehicle wheel is effected by providing the gravel guard member 30 with a series of spaced spring retaining clips 41 which are secured to the back side of the gravel guard by means, such as rivets 45, passing through openings 46 in the inner flange section 32 of the gravel guard.

It will be observed that any appropriate number of spring finger clips 41 may be used, provision being illustrated in Fig. 3 for receiving five of the spring clips, although a smaller or larger number may be used.

The spring clips have a base flange 42 riveted to the inner flange section 32 of the gravel guard section adjacent to the gravel guard reinforcing rib 35. Extending radially inwardly and axially inwardly from the base flange 42 and then curving reversely in a radially outward and axially outward direction is a resilient finger loop portion 43 which constitutes the resilient body of the spring clip. The finger portion 43 terminates in a short and stiff generally radially outwardly directed terminal flange 44 which is adapted to grip the inner surface of the intermediate rim flange 16 for retaining the composite cover in place on the wheel. To prevent turning of the spring clip about its retaining rivet 45, a tail portion 47 is provided on the base flange 42, the tail portion being curved to seat snugly against the rib 35 of the gravel guard.

In the initial assembly of the central circular crown member 21 with the outer annular ring member 22, the spokes 24 are respectively interfitted between the spokes 27 so that the ends of the spokes 24 fit into the apertures 37 provided in the inner flange section of the gravel guard.

Following this, the reinforcing flange 34 of the outer cover portion 26 is crimped to secure the gravel guard to the ring member 22.

In applying the composite cover 10 to the wheel, the cover is generally centered with respect to the wheel so that the retaining flanges 44 of the spring clips bottom against the radially inner shoulder of terminal rim flange 17. The cover is then pressed axially inwardly so that the curved rim shoulder cams the retaining terminals 44 radially inwardly. As the cover is moved axially onto the wheel, the extremities of the fingers slide along the radially inner surface of the intermediate rim flange 16 until the terminal edge 39 of the gravel guard abuts the radially inner shoulder of rim flange 15 at juncture with the wheel body. In this position the retaining clips 41 are placed under tension with the retaining terminals 44 in gripping engagement with the rim flange 16 to retain the cover on the wheel.

For removing the composite cover 10, the end of a pry-off tool such as a screw driver (not shown) is inserted behind the underturned flange 34 of the cover and leverage is applied to exert an outward force on the multi-layer outer margin of the cover, using the tire rim as a fulcrum.

Reference is made to my co-pending application Serial No. 323,628 filed December 2, 1952, covering novel features of the retaining spring clips disclosed but not claimed herein.

It will be further understood that modifications and variations may be effected without departing from the scope of the novel concepts of the present invention.

I claim as my invention:

1. In a wheel cover for a vehicle wheel, a ring member including an outer annular portion having a plurality of elongated spoke elements extending generally radially inwardly and angled peripherally in one direction of rotation, said spoke elements terminating in an inner marginal flange, a crown member overlying said inner marginal flange and having elongated spoke elements projecting radially outwardly and axially inwardly and angled peripherally in an opposite direction of rotation from said first mentioned spoke elements, said oppositely angled spoke elements being respectively disposed in generally X-relation with said first mentioned spoke elements, a gravel guard carried by said outer annular portion, said guard having a plurality of apertures for respectively receiving therethrough said second mentioned spoke elements, and said spoke elements being transversely rounded to afford a crossed wire spoke simulating effect.

2. In a wheel cover for a vehicle wheel having a tire rim and a wheel body, a ring cover member having an outer annular margin and an inner annular margin spaced from and concentric to each other, a plurality of radially disposed spaced elongated spoke elements extending between and joining said inner and outer annular margins, a central crown cover member overlying said inner annular margin and having radially outwardly and axially inwardly extending spoke elements respectively paired with said first mentioned spoke elements, a gravel guard carried by said ring cover member, said guard having a plurality of apertures for respectively receiving therethrough said second mentioned spoke elements, said first mentioned spokes being angled in one direction, said second mentioned spokes being angled in an opposite direction, whereby each pair of spokes is positioned in crossing relation.

3. In a wheel cover for a vehicle wheel having a tire rim and a wheel body, a ring cover member including an outer ring flange having a plurality of radially inwardly extending spoke elements terminating in an inner ring flange, a crown cover member overlying said inner ring flange and having radially outwardly and axially inwardly extending spoke elements, said crown spoke elements being angled respectively in generally X-relation with corresponding ring spoke elements, an annular gravel guard carried by said outer ring flange, an inner margin on said guard having a plurality of apertures for respectively receiving therethrough said crown spoke elements, said inner margin having an axially inwardly extending terminal portion adapted to seat against the tire rim for limiting axially inward movement of said wheel cover as said cover is applied to the vehicle wheel.

4. In a wheel cover for a vehicle wheel having a tire rim and a wheel body, a ring cover member including an outer ring flange having a plurality of radially inwardly extending spoke elements terminating in an inner ring flange, and a crown cover member overlying said inner ring flange and having radially outwardly and axially inwardly extending spoke elements disposed respectively in crossing relation with said first mentioned spoke elements, an annular gravel guard carried by said outer ring flange, an annular inner margin on said guard having a plurality of apertures for respectively receiving therethrough said second mentioned spokes, a plurality of self-retaining spring clips carried by said gravel guard, said clips having tips adapted to grippingly engage the tire rim to retain said cover on the wheel.

5. In a wheel structure including wheel parts, a cover including a plurality of wire spoke simulating elements; a gravel guard secured to the back side of said cover and bodily carried thereby; said guard including means for receiving said spoke elements, and stop means for limiting axial inward movement of the cover assembly in the application of the cover to the wheel; and spring means carried by said guard for engaging a wheel part to retain the cover on the wheel.

6. In a vehicle wheel having a tire rim, a wheel cover and a gravel guard, said wheel cover having a ring member extending radially and axially outward, said gravel guard having an annular outer margin underlying said ring member and an inner margin integral with said outer margin, a reinforcing underturned outer terminal flange on said ring member for securing said gravel guard to said ring member, said inner margin having a plurality of apertures, wire spoke simulating elements on said cover and interfitting in said apertures, said inner margin terminating in a cylindrical section adapted to seat against the tire rim, and a plurality of spring clips secured to said inner margin for engaging the tire rim for retaining said cover on the wheel.

7. In a cover for disposition at the outer side of a vehicle wheel, an annular cover member having radially spaced portions connected together by a series of generally radially extending spoke elements, a crown cover portion cooperating with the radially inner of said annular cover portions and having spoke elements projecting generally radially outwardly therefrom, and a third cover member cooperating with said radially outer annular cover portion and having the spoke elements of the crown cover portion connected thereto.

8. In a cover for disposition at the outer side of a vehicle wheel, an annular cover member having radially spaced portions connected together by a series of generally radially extending spoke elements, a crown cover portion cooperating with the radially inner of said annular cover portions and having spoke elements projecting generally radially outwardly therefrom, and a third cover member cooperating with said radially outer annular cover portion and having the spoke elements of the crown cover portion connected thereto, said third cover portion being substantially concealed behind said radially outer annular cover portion.

References Cited in the file of this patent

UNITED STATES PATENTS

| D. 170,464 | Jenkins | Sept. 22, 1953 |
| 2,193,104 | Lyon | Mar. 12, 1940 |
| 2,368,230 | Lyon | Jan. 30, 1945 |
| 2,386,237 | Lyon | Oct. 9, 1945 |
| 2,404,390 | Lyon | July 23, 1946 |
| 2,426,109 | Lyon | Aug. 19, 1947 |
| 2,433,854 | Lyon | Jan. 6, 1948 |
| 2,544,704 | Lyon | Mar. 13, 1951 |
| 2,687,192 | Butterfield | Aug. 24, 1954 |

FOREIGN PATENTS

| 714,587 | France | Nov. 17, 1931 |